Patented July 8, 1924.

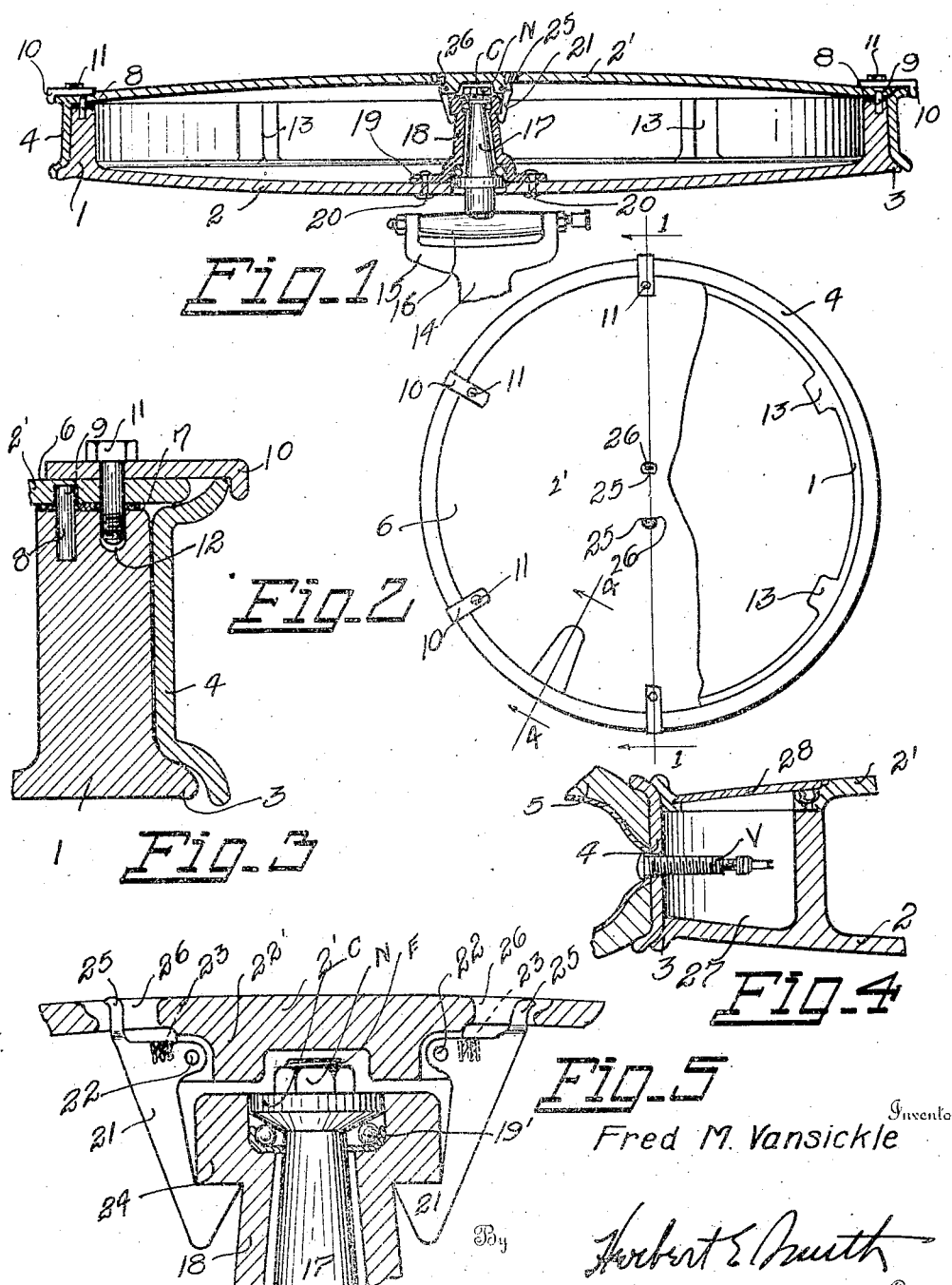

1,500,350

UNITED STATES PATENT OFFICE.

FRED M. VANSICKLE, OF LEWISTON, IDAHO.

VEHICLE WHEEL.

Application filed September 1, 1923. Serial No. 660,616.

*To all whom it may concern:*

Be it known that I, FRED M. VANSICKLE, a citizen of the United States, residing at Lewiston, in Nez Perce County and State of Idaho, have invented certain new and useful Improvements in Vehicle Wheels, of which the following is a specification.

My present invention relates to improvements in vehicle wheels of the disk type and especially adapted for use with automobiles and other automotive vehicles where a finished and attractive appearance for the wheel is desired and dust proof and water proof construction are required.

In the physical embodiment of my invention the wheel is adapted for use with standard pneumatic tires and fastening devices and with standard forms or types of automobile wheel hubs and connections, and as shown in the accompanying drawings the invention consists in certain novel combinations and arrangements of parts as will be hereinafter more fully disclosed and claimed.

In the accompanying drawings one complete example of the physical embodiment of my invention is illustrated wherein the parts are combined and arranged in accordance with the best mode I have thus far devised for the practical application of the principles of my invention.

Figure 1 is a sectional view at line 1—1 of Fig. 2 showing the wheel, omitting the tire, as embodied in my invention.

Figure 2 is a view in side elevation at the outer side of the wheel, a portion of the cover plate being broken away for convenience of illustration.

Figure 3 is an enlarged detail sectional view at the periphery of the wheel, the tire being omitted, showing the relation of the felly and demountable rim and a portion of the tire, or rim fastening means.

Figure 4 is a detail sectional view at line 4—4 of Fig. 2 showing the pocket for the valve of the tire.

Figure 5 is a detail sectional view illustrating the manner of securing the outside, detachable cover plate to the central or hub structure of the wheel.

In the preferred form of the invention the main body portion of the wheel structure is fashioned in suitable manner with a felly 1 and integral, dished web or disk 2, the felly being provided with an annular flange 3 at the inner side of the wheel. The web or disk as shown is concavo convex in form and the integral body portion of the wheel is open at the outer side, but when assembled for use is closed by a cover plate 2' stamped or otherwise fashioned from sheet metal and presenting a smooth and finished appearance to the outer side of the wheel.

The felly of the wheel is adapted to receive the standard form of metal, flanged rim 4 for the standard form of pneumatic tire 5, and the detachable cover plate 2' at its perimeter 6 projects beyond the rim 4 a sufficient distance to retain the rim on the felly.

To insure a water and dust proof joint between the cover plate and the body of the wheel a gasket or packing ring 7 is interposed between the perimeter of the cover plate and the outer face of the felly as seen in Fig. 3, and centering pins or dowels 8, two or more in number, are fixed to the felly to engage sockets 9 in the inner face of the cover plate, to assist in applying the cover plate at the outer side of the wheel.

By the utilization of a suitable number of locking or fastening lugs 10 distributed at intervals around the periphery of the wheel and engaging the rim 4, the rim and tire are fastened to the felly, and the usual type of locking bolts 11 passing through the lugs, cover plate and gasket, into the bolt holes 12 in integral lugs 13 of the felly, are employed to secure the parts in position. By the removal of these lugs 10 and bolts 11 and by removing the cover plate ready access may be had to the demountable rim and tire for withdrawing them from the wheel when required, and the parts may be re-assembled with equal facility.

In Fig. 1 I have shown a portion of a front axle 14 of an automotive vehicle which as usual is fashioned with the steering head 15, and the steering knuckle 16 and wheel spindle 17 are of well known type. The hub sleeve 18 for the spindle is fashioned with an attaching flange 19 and the flange is secured to the outer face of the disk 2 by means of rivets as 20, the sleeve and disk thus forming a rigid structure. Between the hub sleeve and journal spaced journal bearings of the ball type are indicated at 19', the outer or end bearing being a thrust bearing to retain the wheel on its journal. This bearing includes a hub cap C and nut N on the threaded end E of the spindle 17 as shown clearly in Fig. 5.

To prevent vibration and noise and to hold the cover plate in rigid position with respect to the center or hub portion of the wheel I utilize a pair of latches 21, each of which is pivoted, as at 22 in a boss 22' at the central inner side of the cover plate, and springs 23 which engage these latches hold them in engagement with the annular head 24 of the hub sleeve. The cover plate of course rotates with the hub sleeve and by means of these latches the plate is prevented from bulging outwardly and is maintained in rigid relation to the hub sleeve.

When it is necessary to dismount the rim and tire these latches may be disengaged from the hub head 24 by applying the thumb or a screw driver to the thumb piece 25 of a latch, access to which may be had through an opening 26 (as seen in Figs. 2 and 5) through the cover plate.

To accommodate the valve V of the pneumatic tire a pocket 27 is formed at the periphery of the wheel body, in the felly, as seen in Fig. 4, and a closure or plate 28 is attached by suitable means to the wheel body for the protection of the valve.

From the above description taken in connection with my drawings it will be evident that I have provided a wheel structure which is strong and durable, comparatively simple in construction and readily adapted for use. By the simple arrangement of parts the wheel may with facility be applied to or withdrawn from its journal, and when required the tire and rim may with equal facility be detached from or attached to the wheel structure.

Having thus fully described my invention, what I claim as new and desire to secure by Letters Patent is—

1. The combination with a wheel body comprising an integral disk and felly and a tire-rim on the felly, of a cover plate and means for attaching said plate to the hub structure of the wheel, and fastening lugs carried by said cover plate for engagement with the tire rim for the purpose described.

2. The combination with a wheel body comprising an integral disk and felly and a hub sleeve rigidly attached to said disk, of a cover plate, a rim on the felly and means on the cover plate for retaining said rim, and detachable means carried by said cover plate for engagement with the hub sleeve.

3. The combination with a disk wheel having a rigid hub sleeve and a head on the sleeve, of a cover plate for said wheel, a pair of latches pivoted at the inner side of said cover plate for engagement with said head, and means whereby said latches may be disengaged from the exterior of the cover plate.

4. The combination with a disk wheel having a rigid hub sleeve and a head on the sleeve, of a cover plate having openings near its center, a pair of latches pivoted at the inner side of said cover plate, and extensions on said latches projecting through said openings, for the purpose described.

5. The combination with a disk wheel having a felly and a rigid hub sleeve, of a cover plate and means for detachably connecting said plate to the hub sleeve, a tire rim on the felly, spaced retaining lugs for said rim and fastening bolts passed through said lugs and cover plate and secured in said felly.

In testimony whereof I affix my signature.

FRED M. VANSICKLE.